INVENTOR
Benjamin L. Binford

BY Strauch, Nolan & Neale
ATTORNEYS

Dec. 13, 1966   B. L. BINFORD   3,291,389
METERING SYSTEM AND COMPONENTS THEREOF
Filed May 9, 1963   9 Sheets-Sheet 3

INVENTOR
Benjamin L. Binford

BY  Strauch, Nolan & Neale
ATTORNEYS

Dec. 13, 1966  B. L. BINFORD  3,291,389
METERING SYSTEM AND COMPONENTS THEREOF
Filed May 9, 1963  9 Sheets-Sheet 5

INVENTOR
BENJAMIN L. BINFORD

BY  Strauch, Nolan & Neale
ATTORNEYS

INVENTOR.
BENJAMIN L. BINFORD
BY
Strauch, Nolan & Neale

Dec. 13, 1966   B. L. BINFORD   3,291,389
METERING SYSTEM AND COMPONENTS THEREOF
Filed May 9, 1963   9 Sheets-Sheet 7

INVENTOR.
BENJAMIN L. BINFORD
BY
Strauch, Nolan & Neale
ATTORNEYS

INVENTOR.
BENJAMIN L. BINFORD
BY
Strauch, Nolan & Neale
ATTORNEYS

3,291,389
METERING SYSTEM AND COMPONENTS THEREOF
Benjamin L. Binford, Statesboro, Ga., assignor to Rockwell Manufacturing Company, Pittsburgh, Pa., a corporation of Pennsylvania
Filed May 9, 1963, Ser. No. 279,072
12 Claims. (Cl. 235—94)

This application is a continuation-in-part of my now abandoned application Serial No. 127,391 entitled, "Metering System and Components Thereof," and filed July 27, 1961.

The present invention relates to improvement in fluid meters and more particularly to the provision of new and improved fluid meter actuated electrical signal generators and improved fluid meter actuated electrical signal generator responsive and controlled systems.

In one of its more important aspects, the present invention is directed to a selective indicating device adapted for use on a fuel loading dock, for example, wherein a plurality of separately identifiable consumers each take fuel from a single source. This aspect of the invention is specifically directed to a means of identifying the separate amounts of fuel taken by each of the separate consumers from the single source. For this purpose, the invention provides a device whereby each consumer has a separate meter registering device, with each consumer's access being limited to that assigned meter registering device and no other.

Present devices for measuring quantities of fluid taken by each consumer at a common loading dock require that an attendant be present at the dock whenever fluid is being loaded by the consumer. This is required in order to assure that each consumer is billed only for the amount of fluid or material taken by him. Another alternate device commonly present on such loading docks requires that each consumer punch a card at the beginning and end of each loading period and present the card to an attendant for recording. This system however also lends itself to inaccuracies and to piracy by anyone desiring to do so. Further, it requires the maintenance of a separate card system with its added difficulties.

The device of the present invention eliminates the need for the presence of an attendant at the loading dock whenever fluid is loaded by the consumer as well as the maintenance of a separate card system to record and identify the fluid loaded. The dispensing system of the present invention gives two separate indications of the amount of fluid obtained by each consumer. One indication is given on a "totalizing" meter, which meter may be located in the attendant's office, and the other meter is individually assigned to each consumer at the common loading dock and indicates the total fluid loaded by that consumer.

In another of its important aspects, the present invention provides an improved positive displacement meter actuated electrical signal generator which is applicable to a wide variety of types of positive displacement meters, which is selectively variable to accommodate a wide variety of desired output signal to meter fluid throughout ratios thereby permitting its use for a variety of control and metering purposes, which may be utilized in connection with combustible fluids without danger of explosion and which is completely reliable.

With the foregoing considerations in view, the principal objects of the present invention are to provide:

(1) A mechanical direct registering positive displacement fluid meter equipped with an electrical signal generating device actuated in a predetermined relation to the meter output and the output signal of which can be utilized for remote registration and/or control purposes;

(2) An improved electrical signal generating device adapted for operative interposition between a positive displacement metering device and a mechanical meter register coupled thereto without danger of explosion of the fluid being metered.

(3) An electrical signal generating device adapted for operative interposition between a positive displacement meter and an associated mechanical register and embodying a selectively variable speed reduction mechanism by which the signal generator is operable to produce a periodic output signal at selectively variable relations to the meter output.

(4) A novel fluid flow responsive control system in which an electrical signal responsive device is actuated in response to electrical signals transmitted by an electrical signal generator directly mechanically coupled to the output of a positive displacement fluid meter.

(5) An improved fluid flow responsive control system in which a plurality of signal responsive devices are selectively connectable for actuation by a common signal generator actuated directly by the output of a positive displacement fluid flow meter.

(6) An improved self service fluid dispensing system by which a record can be maintained under control of a single fluid meter of the quantity of fluid dispensed to each of a plurality of customers.

(7) An improved control system for a self service fluid dispensing system embodying a plurality of customer control stations located at a loading rack and master controls located remote from said customer control stations for selectively conditioning said control system for actuation at the customer control stations.

(8) A fluid registering mechanism having an explosion and fire proof housing forming a compartment and a plurality of electrically operated registers which are disposed in said compartment and which are selectively and non-mechanically connected to a signal generating source by a novel key control system disposed exteriorly of said compartment.

(9) A registering mechanism having a structurally distinct sub-assembly mounted within an explosion proof casing compartment and embodying a plurality of switch actuated register units mounted solely upon a frame normally disposed in said compartment and hinged for swinging movement to a position outside of the compartment to provide ready and convenient access to the register units and the switches therefor.

(10) A registering mechanism having at least one magnetically actuatable switch adapted to condition an electrically actuated register for operation and detachably mounted on a frame by a set of clips which retain and position the switch in a position properly oriented relative to a movable magnet to assure that switch is subjectable to maximum influence of the magnet when the latter is moved into a predetermined switch actuating position.

(11) A registering mechanism having a plurality of electrically operated registers respectively conditioned by a like plurality of magnetically actuated switches to manifest the amount of fluid dispensed from a fluid source and a magnet associated with each switch and selectively positionable by a lock and key set to control the actuation of the switches wherein the arrangement of magnets and switches limits the influence of each magnet to one predetermined switch and provides for a compact assembly.

(12) A removable signal generator attachment adapted to be mounted in a fluid meter assembly between a meter output shaft and a meter register and embodying a signal generating apparatus for producing electrical pulses in predetermined relation to the flow of fluid through the meter.

(13) A removable signal generator attachment adapted to be mounted on a meter mounting pad interchangeably with a meter register.

(14) A removable signal generator attachment having a drive train detachably connected to a meter output element, a main housing detachably seated on a mounting surface in a fluid meter assembly and containing the drive train, an auxiliary fire and explosion housing detachably mounted on the main housing and containing an electrical pulse generating unit physically isolated from the drive train and being actuatable thereby.

These and other objects of the present invention will become more fully apparent by reference to the appended claims and as the following description proceeds in reference to the accompanying drawings wherein:

Figure 1:
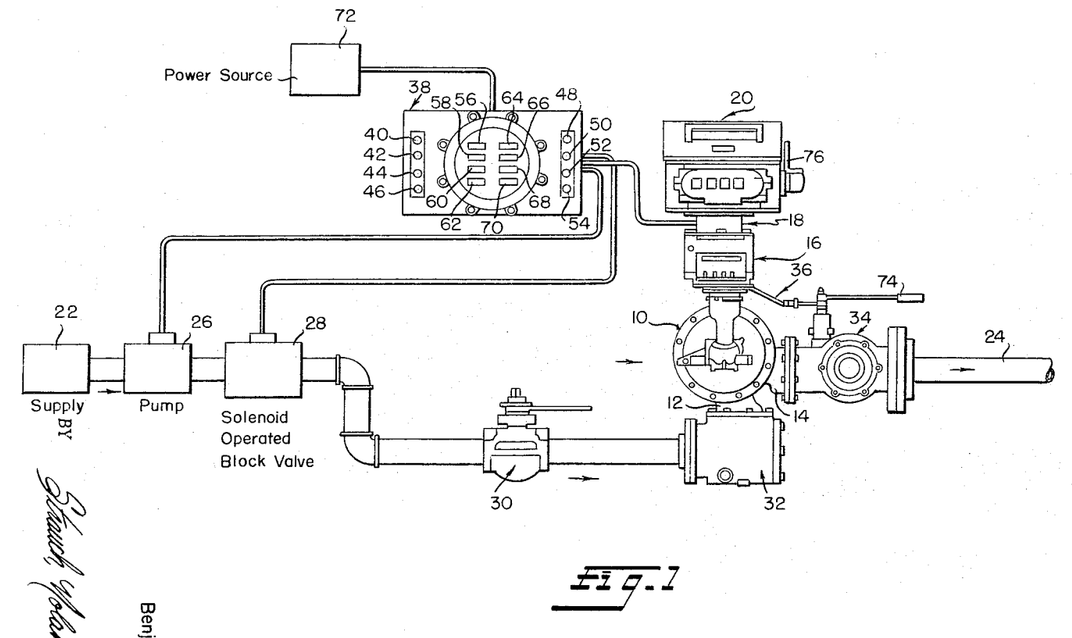
FIGURE 1 is a diagrammatic illustration of a self service fluid dispensing system constructed in accord with one embodiment of the present invention.

Referring now in detail to FIGURE 1, the system therein shown is a self service fluid dispensing system and comprises a positive displacement fluid meter 10 having a fluid inlet 12, a fluid outlet 14 and a mechanical output shaft (not shown) driving a selectively presettable predetermining register 16, an electrical signal generator 18, and a ticket printing totalizing register 20. The meter 10 may be of the type shown in United States Patent Number 2,274,206, issued February 24, 1942 to W. H. Marsh for "Rotary Fluid Meter." The meter 10 is connected in series fluid communication between a fluid supply 22 and a delivery conduit 24 with a pump 26, a solenoid operated block valve 28, a manually actuated tapered lubricated plug shut-off valve 30, a strainer 32, and a multi-stage quantity control valve 34 mechanically connected by a linkage 36 to the output of presettable register 16. Valve 34, meter 10, preset register 16 and the linkage 36 together form a predetermining dispensing apparatus as is fully shown and described in United States Letters Patent Number 2,818,198, issued December 31, 1957, to G. E. Batehelder et al. or United States Patent Number 2,892,500, issued June 30, 1959, to E. Thoresen.

As will be explained more fully in reference to FIGURE 6, the pump 26 and solenoid operated block valve 28 are energized under control of a key control panel 38. Key control panel 38 embodies a plurality of locks 40–54 associated respectively with a like plurality of electromagnetically actuated mechanical plural order registers or counters 56–70 as is most clearly shown in FIGURE 6 and as will be described in detail hereinafter. The key control panel 38 and its associated circuitry is energized from a suitable electrical power source 72 such as a 110-volt A.C. source.

Briefly, the operation of the system shown in FIGURE 1 is as follows: a customer desiring to obtain fluid from the supply 22 inserts his key in his lock, such as 40, and turns that lock to its unlocked or "on" position. The unlocking af lock 40 will actuate an electrical switch to connect the operating coil of the associated register 56 to the signal generator 18 so that, as fluid passes through the meter 10, the register 56 will be electromagnetically actuated simultaneously with the mechanical actuation of the registers 16 and 20. Register 56 will thus provide a registration of the total volume of fluid dispensed through the meter 10 to the customer whose lock is 40. Actuation of the lock 40 to its unlocked position will simultaneously energize pump 26 and solenoid operated block valve 28 to permit flow of fluid from the supply 22 through the pump 26, the solenoid operated block valve 28, the normally open manually controlled shut-off valve 30 and the strainer 32 to the inlet 12 of the meter 10. The amount of fluid desired by the customer is set on the predetermining register 16 and, initiation of flow through the system is effected by actuation of the handle 74 associated with the linkage 36 on the valve 34. The handle 74 is moved to open the valve 34 and will remain in its open position until the preset register 16 reaches the quantity preselected by the customer. When the quantity preset on register 16 is reached, register 16 will, through the linkage 36, restore handle 74 of the valve 34 to the closed shut-off position. When the valve 34 recloses, the customer will lock his lock 40 and remove his key. By actuation of the handle 76 on a ticket printing register 20, register 20 will print and eject a ticket record of the volume of fluid dispensed. The register 56 will thus provide a continuous running total of the quantity of fluid withdrawn from the supply 22 by the customer whose key fits lock 40. Similarly, registers 58 through 70 will provide continuous records of the total quantities of fluid withdrawn from the supply 22 by the customers whose keys fit locks 42–54, respectively.

A typical application of the system of FIGURE 1 is in bulk plant terminals. The system of FIGURE 1 permits unattended round-the-clock loading schedules in bulk plant terminals. The system is explosion and theft proof, provides safety and security, and permits each loading terminal to operate on its own. A sanctioned driver positions his truck, prepares to load in the conventional manner, inserts his key in his private lock and he is ready to load. Once he inserts his key, the system of FIGURE 1 takes over, simultaneously starts the pump and opens the block valve and interlocks his electrical totalizing counter. When the driver is through loading, he withdraws his key and the system shuts off automatically. The exact amount passed through the meter and loaded on his truck is recorded on his particular totalizing register and on his printed ticket.

The structure of the signal generator 18 of the system of FIGURE 1 is shown in detail in FIGURES 2, 3, 4 and 5.

The generator 18 embodies a cast aluminum housing 77. Housing 77 has a central cylindrical wall 78 which terminates at its opposite ends in radial mounting flanges 80 and 82 and a radially projecting boss 84 disposed between flanges 80 and 82. The interior of the housing 77 defines a hollow chamber in communication with the hollow interior of the open ended boss 84. The bottom of housing 77 is closed by a transverse wall 86 upon the lower external face of which are formed concentric bosses 88 and 90 adapted for piloting engagement with complementary recesses on the top face of the presettable register 16, an interposed temperature compensating device (such as that shown in United States Patent Number 2,438,934, issued April 16, 1948, to W. H. Marsh for "Temperature Compensated Meter") or upon the top of the housing of the meter 10 in the event that the signal generator 18 is directly coupled to the output of the meter 10. To this end, it will be appreciated that when generator 18 is mounted directly on meter 10, housing 77 is detachably seated, according to one form of the invention, on a rigid meter mounting pad 91 as shown in FIGURES 1 and 6a. Pad 91 is provided with complementary recesses indicated at 91a and receiving bosses 88 and 90. It is clear from the different foregoing arrangements that the seating surfaces formed by bosses 88 and 90 are preferably substantially identical to the corresponding mounting pad seating surfaces on register 16 to enable register 16 and generator 18 to be interchangeably mounted on pad 91.

The top face 92 of the housing 77 is provided with shallow cylindrical recess 94 for piloting engagement with a boss similar to boss 88 on the under side of the register 20. As is apparent from FIGURE 2, the flanges 80 and 82 are provided with suitable bolt receiving apertures 96 to permit rigid assembly of the housing 77 between the housings of the register 20 and the register 16.

A carrier plate 98 is mounted by a plurality of screws 100 upon internally projecting bosses 102 within the interior chamber of the housing 77.

Carrier 98 and wall 86 support coaxial antifriction bearings 104 and 106 journalling a shaft 108 extending coaxially through the housing 77. Shaft 108 projects at its lower end through the bearing 106 and has a gear 110 fixed thereto and in constant mesh with a pinion 112 fixed to the output shaft 114 of the register 16 or the meter 10 in the event that the register 16 is omitted. As is apparent from FIGURE 3, wall 86 supports a pair of anti-friction bearings 116 and 118 providing the upper bearing support for the shaft 114. An output coupling 120 is fixed to the upper end of the shaft 108 by set screws 121 providing a connection to the input shaft of the ticket printing register 20. By this construction, there is a direct drive connection from the meter 10 through the register 16, the impulse generator 18 to the register 20.

Figure 2:
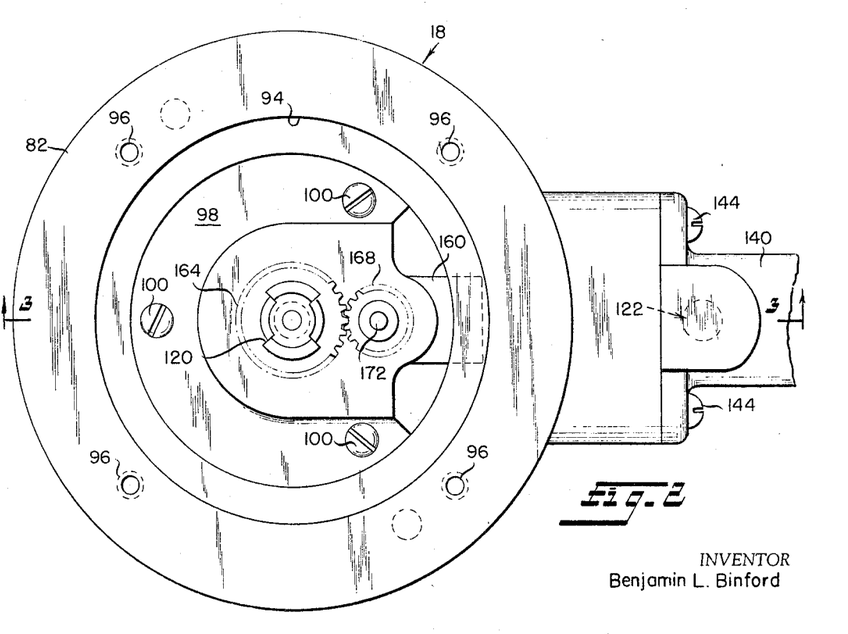
FIGURE 2 is a top plan view of the signal generator of the present invention utilized in the system of FIGURE 1.
Figure 4:
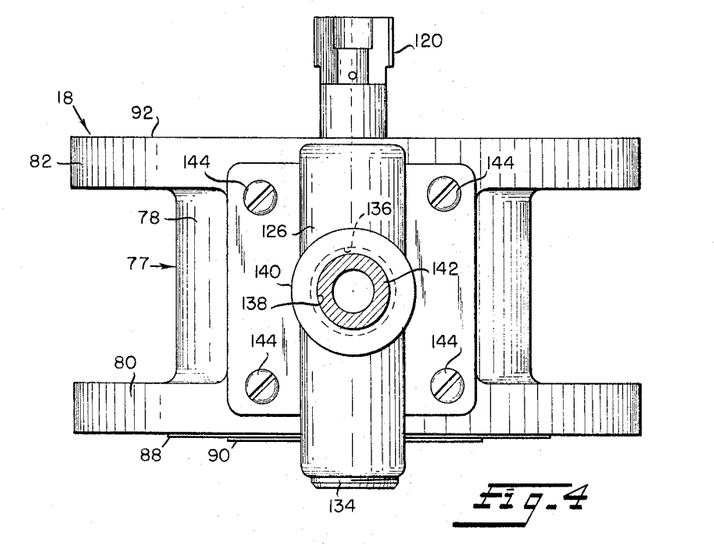
FIGURE 4 is a right side view of the structure shown in FIGURES 2 and 3.

The impulse generator 18 embodies a magnetically actuatable glass encapsulated reed switch 122 of the type shown and described in detail in United States Patent Number 2,289,830, issued July 14, 1942, to W. B. Ellwood for "Circuit Closing Device." The encapsulated switch 122 is disposed within the interior cylindrical chamber 124 of a non-magnetic metallic casing 126 being surrounded therein by a cylindrical non-magnetic liner 128 and non-magnetic end discs or plates 130 and 132. The liner structure 128, 130 and 132 and the reed switch 122 are held in assembled relation within the chamber 124 by a closure screw 134 which is suitably fixed within the threaded end wall of the cylindrical chamber 124. The electrical leads (not shown) from the switch 122 pass through the aperture 136 in liner 128 and the aperture 138 of the side boss 140 on the casing 126 into the electrical conduit 142. For ease of replacement the casing 126 is removably fixed to the end of the boss 84 of the housing 77 by mounting screws 144 as is best shown in FIGURES 2 and 4. The casing 126 is explosion proof and physically isolates the switch 122 from the fluid being metered to prevent explosion thereof.

Switch 122 is actuated by a magnet 146. Magnet 146 is a permanent magnet having a pair of spaced poles as indicated by the letters "N" and "S" and has a central through bore 148 through which projects a shaft 150. Magnet 146 is fixed axially of shaft 150 between an enlarged portion 152 thereof seated within the bore 154 of magnet 146 and collar 156 fixed to shaft 150 by dowel pin 158. Shaft 150 is journalled upon a boss 160 integral with the carrier 98 by a bearing 162 for rotation about an axis normal to and intersecting the axis of shaft 108. Shaft 150 is drive connected to shaft 108 by a gear train comprising a gear 164 fixed by a pin 166 to shaft 108, a pinion 168 in constant mesh with gear 164 and fixed by a pin 170 to a shaft 172 journalled by a bearing 174 upon the carrier 98 in parallel relation with shaft 108, a bevel gear 176 fixed to the lower end of shaft 172 by a pin 178, and a bevel pinion 180 fixed by pins 182 and 184 to shaft 150 in constant mesh with the bevel gear 176. By this arrangement, rotation of the shaft 108 in response to fluid flow through the meter 10 (FIGURE 1) imparts rotation to the magnet 146 about the axis of shaft 150 in a predetermined relation determined by the ratio of the gears 164, 168, 176 and 180.

The magnet 146 is mounted on the shaft 150 in such a manner that its opposite poles designated "N" and "S" rotate in the common annular path lying in a plane normal to the axis of shaft 50.

The longitudinal axis of the reed switch 122 is preferably disposed in parallel relation to the axis of shaft 108 and in the plane defined by the axes of shafts 108 and 150 so that the longitudinal axis of the reed switch 122 is in diametral relation to the annular pole rotation path and the axis of rotation of the magnet 146 and the reed switch 122 is in adjacent relation to the annular path of movement of the poles of the magnet 146. The reeds (not shown) of the switch 122 are disposed in planes parallel to the path of rotation of the poles of the magnet 146 so that when the poles of the magnet 146 become aligned wtih the reeds of the switch 122 diametrally of the axis of the shaft 150, the magnetic flux between the poles of the magnet 146 will pass through the reeds of the switch 122 and cause them to move together to close the contacts of the switch 122 thereby producing an electrical signal or manifestation. As is apparent, the contacts of switch 122 will be closed in this manner once for every 180° of rotation of the magnet 146 about the axis of the shaft 150.

From the foregoing description it is apparent that generator 18 is structurally distinct from the other components of the fluid dispensing system illustrated in FIGURES 1–6 and is removable as unit simply by removing the flange mounted bolts (not shown) holding housing 77 in place in the assembly and by disconnecting shaft 114 and coupling 120 from generator shaft 108.

Figure 3:
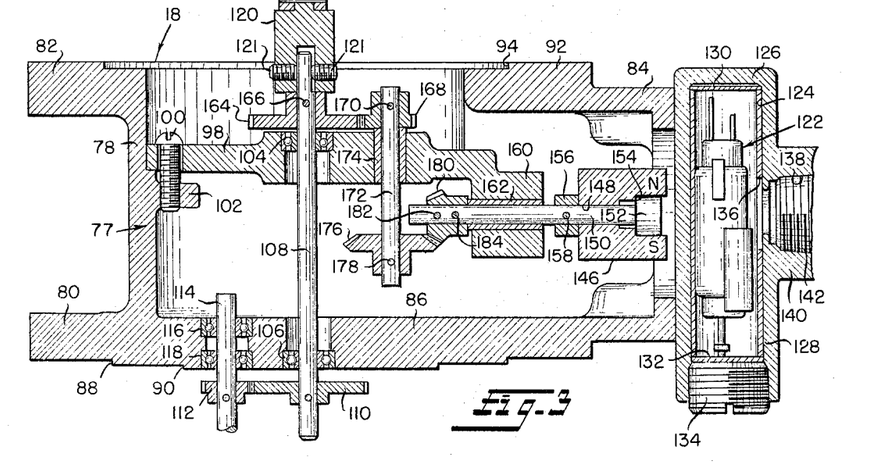
FIGURE 3 is a sectional view taken substantially along line 3—3 of FIGURE 2.

The signal generator of FIGURES 2 through 4 is of general applicability being adapted to provide electrical control of meter flow and operation of counters, samplers, injection devices and other electrically controlled devices. It may be used to open or close an electrical circuit at desired intervals proportional to the number of units measured by the meter such as: one closing for every gallon, or for every tenth gallon, for every barrel, or for every one tenth barrel. Other ratios of closing frequency to meter output may be provided as desired.

The variations in ratios of the closing frequency of the switch 122 to the meter output may be readily selectively varied by interchange of gears 164 and 168 and/or interchange of bevel gears 176 and 180. In the presently commercially available embodiments of this invention, a 1:1 ratio between the number of revolutions of shaft 108 and the number of actuations of switch 122 is obtained by providing a 1:2 ratio of the spur gears 164 and 168 and a 1:1 ratio for gears 176 and 180. A 2:1 ratio between the number of revolutions of shaft 108 and the number of actuations of switch 122 is provided by providing a 1:2 ratio for the gears 164 and 168, and a 2:1 ratio for the bevel gears 176 and 184. A 4:1 ratio between the number of revolutions of shaft 108 and the number of actuations of switch 122 is provided by providing a 2:1 ratio for the spur gears 164 and 168, and a 1:1 ratio for the bevel gears 176 and 180. A 5:1 ratio between the number of revolutions of shaft 108 and the number of actuations of switch 122 is provided by providing a 2:1 ratio for the spur gears 164 and 168, and a 1:1 ratio for the bevel gears 176 and 180. A 10:1 ratio between the number of revolutions of the shaft 108 and the number of actuations of the switch 122 is provided by providing a 2½:1 ratio for the gears 164 and 168 and a 2:1 ratio for the bevel gears 176 and 180.

Figure 5:
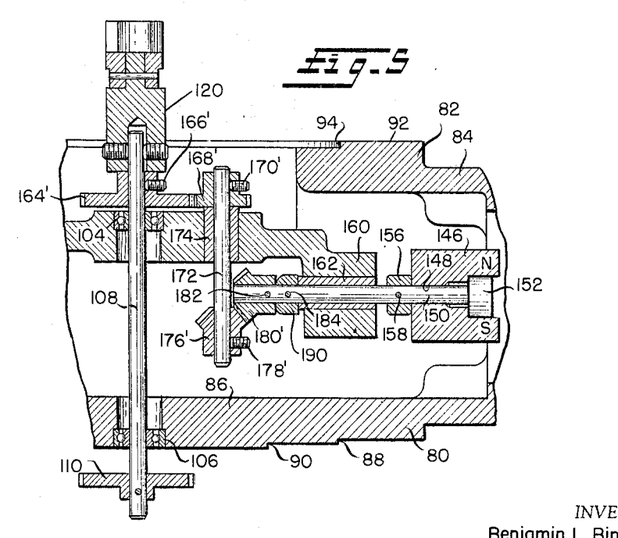
FIGURE 5 is a fragmentary sectional view similar to FIGURE 3 illustrating a modification of the structure as shown in FIGURE 3.

The gear arrangement for a 5:1 ratio between the shaft 108 and the number of actuations of the switch 122 is illustrated in FIGURE 5. For this purpose, the gear 164 has been replaced by a gear 164' and the pinion 168 by a pinion 168' fixed respectively to the shafts 108 and 172 by set screws 166' and 170'. The bevel gear 176 has been replaced by a bevel gear 176' fixed by a set screw 178' to the shaft 172 and a bevel gear 180' fixed to the shaft 150 by pin 182 has been substituted for the gear 180. A collar 190 has been fixed to the shaft 150 by the pin 184, intermediate gear 180' and the bearing 162 to accommodate the change in ratio resulting from the substitution of bevel gears 176' and 180' for the bevel gears 176 and 180.

As is apparent, where the signal generator 18 of the present invention is to be used in environments where an exposed switch will not present a fire hazard, the explosion proof non-magnetic casing by which the switch 122 is attached to the housing 77 can be eliminated, with associated reduction in cost of the unit.

Figure 6:
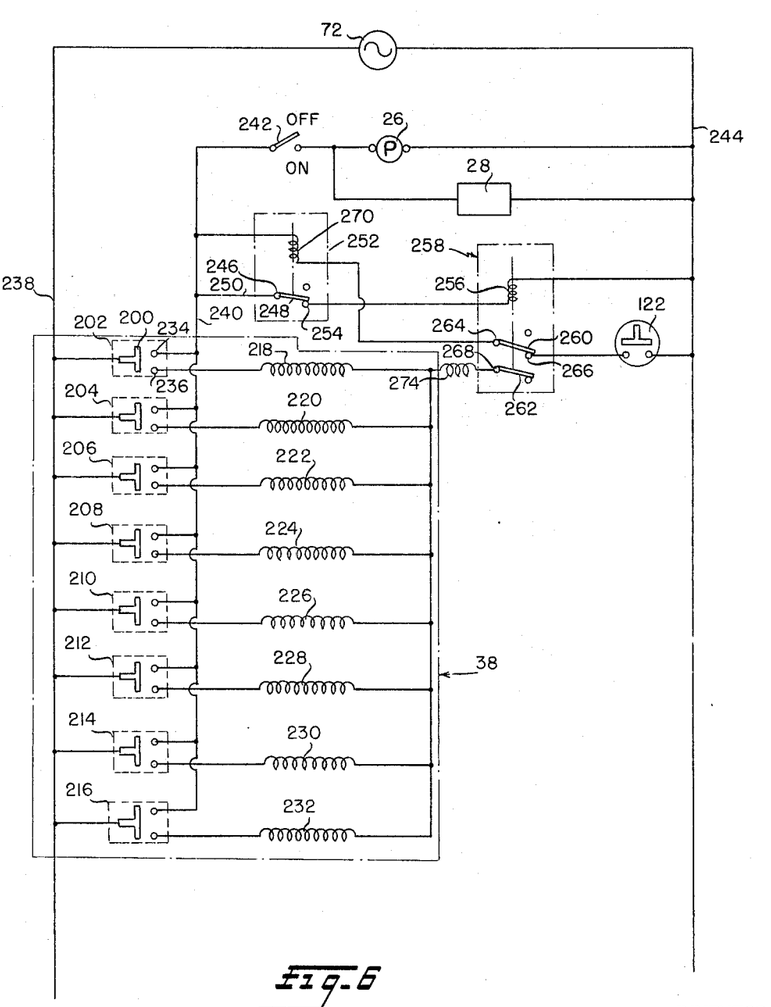
FIGURE 6 is an electrical circuit diagram illustrating the internal circuitry of the key controlled register panel and its interconnection with the signal generator and related components in the system of FIGURE 1.
Figure 6A:
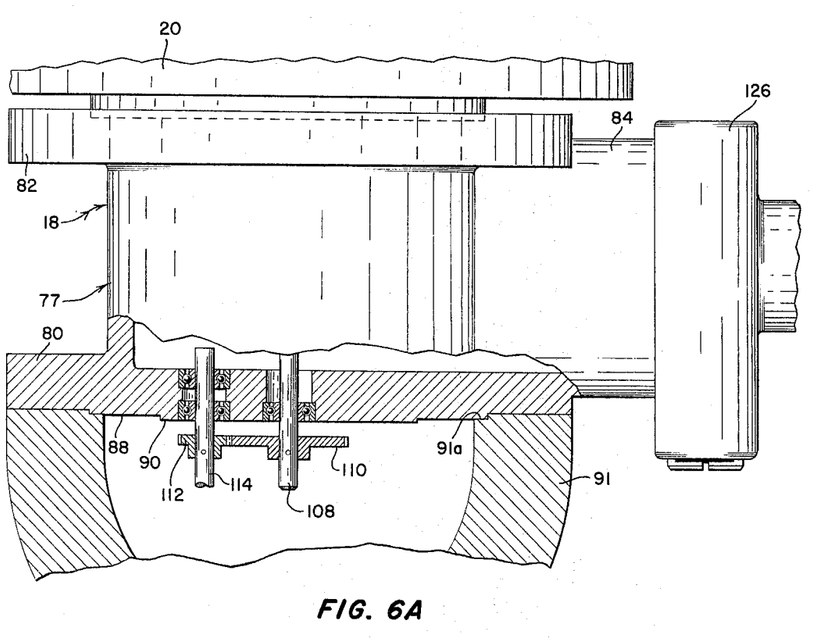
FIGURE 6a is a sectional view similar to FIGURE 3 but showing the signal generator secured directly upon a meter mounting pad.

The electrical circuitry by which the magnetically actuated switch 122 of the signal generator 18 is interconnected with the key control panel 38, the power source 72 and the pump 26 and block valve 28 is illustrated schematically in FIGURE 6.

The locks 40–54 (FIGURE 1) are mechanically connected to the movable blades 200 (FIGURE 6) of the normally open double pole single throw switches 202–216 respectively. The actuating coils of the electromagnetically actuated registers 56–70 (FIGURE 1) are designated 218–232 respectively. When a key is inserted in one of the locks 40–54 and that lock is turned to its "open" or "on" position, the movable blade 200 of the associated one of the switches 202–216 is shifted into contact with both of the fixed terminals 234 and 236 thereof.

The movable contacts 200 of the key actuated switches 202–216 are each electrically connected in parallel to lead 238. One fixed terminal 234 of each of the key switches 202–216 is electrically connected through lead 240 to one terminal of the manually operable pump switch 242, which is normally closed while the installation is in operation. The other terminal of the pump switch 242 is connected to one terminal of the pump 26 and the solenoid valve 28 in parallel, the other terminal of the pump 26 and valve 28 being electrically connected to lead 244 to thereby complete the electrical circuit for the pump 26, valve 28 and metering devices affiliated therewith.

The terminals 234 are also connected in parallel relation with the pump 26 to one terminal 246 of a relay switch 248 through lead 250. The relay, indicated generally at 252, is biased towards a normally closed position whereupon the relay switch 248 is in contact with the other terminals 254 of the relay 252. The terminal 254 of relay 252 is electrically connected through the winding 256 of the relay 258 to lead 244. The armature of the winding 256 is mechanically connected to the switches 260 and 262 of the relay 258. Switch 260 of the relay 258 is biased towards its normally closed position during which time it closes the circuit between terminals 264 and 266. Switch 262 of the relay 258 is biased towards a normally open position.

The other terminals 236 of each of the key actuated switches 202–216 are electrically connected through the coils 218–232 respectively of the totalizers or counters 56–70 respectively to terminal 268 of switch 262.

The normally open read switch 122 of signal generator 18 is electrically connected between the terminal 266 and lead 244 to complete each of the individual circuits.

Relays 252 and 258 are in the system to prevent a false counting when the system is first energized. It should be noted that, if the switch 122 is resting in the closed position at the termination of loading, then an indication would immediately register upon a subsequent energization of the system by a subsequent user if the relays 252 and 258 were omitted.

With the relays 252 and 258 in circuit as shown, however, a false count is impossible. When the system is first energized, the electrical circuit to the register coils 218–232 is interrupted at the relay terminal 266. A count therefore cannot register on the individual registers if reed switch 122 is closed at this time. If the switch 122 is in the closed position upon energization of the system, the electrical current will pass through switch 260 through the winding 270 of the relay 252 to thereby energize the same. Upon energization of the winding 270, the armature of the relay 252 will be attracted to break the electrical connection to winding 256 at switch 248 to thereby retain the relay 258 in the open position with respect to switch 262. When the latent count has expended itself and the fluid flow is initiated, subsequent counts will be registered on the activated one of the individual register coils 218–232 as indicated below.

Once the circuit from reed switch 122 through coil 270 is broken, relay 252 reverts to its normally closed position wherein it completes the circuit through winding 256 to energize the same. When winding 256 is energized, switch 260 opens to prevent re-energization of winding 270, and switch 262 is biased into position to complete the electrical circuit from the switch 122 to each of the common connections to the coils 218–232.

In certain installations in addition to counters 56–70 and in addition to or instead of, counter 20 attached to the meter 10, it may be desirable to provide an electromagnetically actuated counter similar to any one of the counters 56–70 but located remote from the meter. For example, it may be desired to locate such a counter together with switch 242 in a dispatcher's office which is remote from the loading rack and motor but visible to or in communication with the loading rack.

The coil of such a counter is shown in FIGURE 6 by the numeral 274 and would be connected in the lead between lead from counters 218–232 and the terminal 268 of switch 262. Thus, such a counter would count all pulses generated by the signal generator 18 and, as in the case of counter 20, the reading on such a counter would be the sum of the reading on all the counters 56–70. In such an installation the customer would visually or otherwise communicate to the dispatcher his desire to obtain fluid. The dispatcher would then close the switch 242 to condition the circuit of FIGURE 6 to dispense fluid upon actuation of a key in any one of the locks 40–54. The counter in the dispatchers office will then provide an indication of the amount of fluid being drawn off by each customer and ready access to switch 242 will permit interruption or termination of the dispensing operation at the will of the dispatcher.

In the embodiment illustrated in FIGURES 7–16, the lock actuated blade switches 202, 204, 206, 208, 210, 212, 214 and 216 are respectively replaced in the circuit shown in FIGURE 6 with magnetically actuatable glass encapsulated identically constructed reed switches 300, 302, 304, 306, 308, 310, 312, and 314. Switches 300–314 are embodied in a specially constructed key control panel 38a and, as best seen from FIGURE 13, each has a cylindrical insulating tube section 315 and end sockets 316 and 317 at opposite ends of the tube. As will be presently described in detail, switches 300–314 are magnetically actuated by operation of locks 40–54 respectively to enable switches 300–314 and registers 56–70 to be physically isolated from the fluid being metered and the other components of the system in panel 38a.

Figure 12:
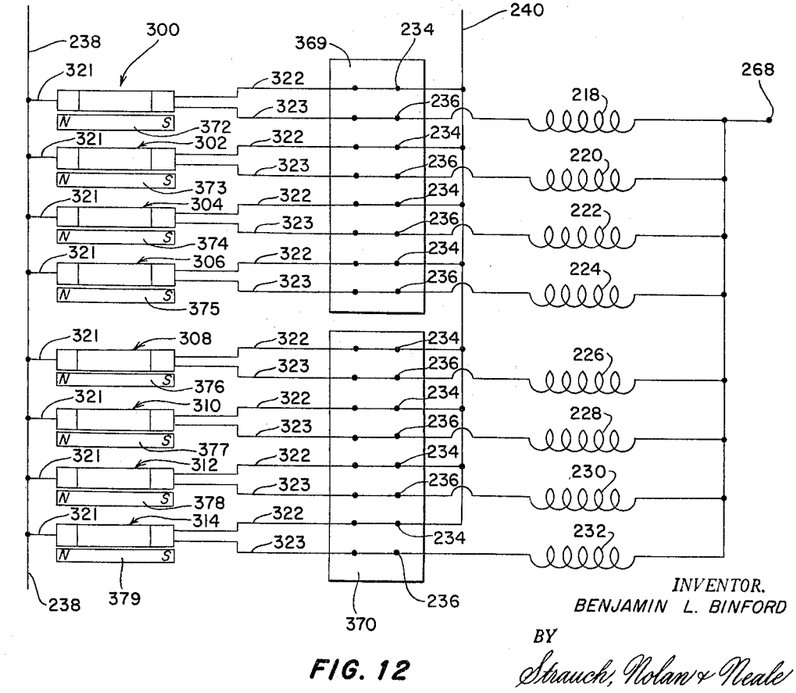
FIGURE 12 is an electrical circuit diagram illustrating that portion of circuitry of FIGURE 6 which has been modified to incorporate the magnetically actuatable reed switches illustrated in FIGURES 8–11.
Figures 13, 14B:
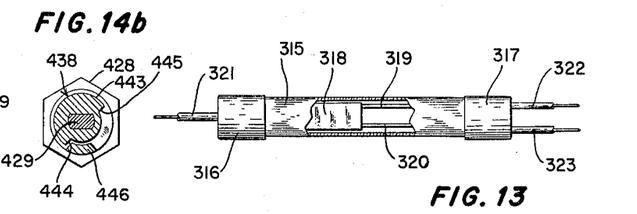
FIGURE 13 is a typical simplified elevation of one of the magnetically actuatable switches illustrated in FIGURES 8–12 with the casing thereof partially broken away to show the interior switch reeds.
FIGURE 14b is a section similar to FIGURE 14a but with the lock barrel rotated 90° to its opposite limit stop.
Figure 13A:
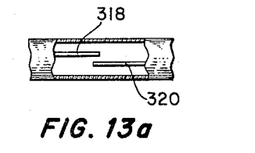
FIGURE 13a is a view of the magnetically actuated switch rotated 90 degrees about its longitudinal axis from the position shown in FIGURE 13.

With reference to FIGURES 12, 13, and 13a reed switches 300–314 are respectively disposed in series circuit relationship with register coils 218–232 and are constructed similar to the type of switch depicted and described in the previously mentioned patent to Ellwood No. 2,289,830 except that switches 300–314 are each provided with a thin relatively flexible reed 318, and stationary contactor elements 319 and 320. Each reed 318 is electrically connected to lead 238 by a conductor 321 and elements 319 and 320 are respectively electrically connected to terminals 234 and 236 by separate electrical conductors 322 and 323. Elements 319 and 320 are mounted at corresponding ends in socket 317 and extend toward to a region in tube section 315 approximately midway between end sockets 316 and 317. Elements 319 and 320 are electrically insulated from each other in end socket 317 and extend in parallel spaced apart relation. Reed 318 is mounted at one end in socket 316 and extend so that its opposite free end overlaps the free end of elements 319 and 320. In absence of magnetic flux, reed 318 is spaced apart from elements 319 and 320 to provide a circuit interrupting air gap between reed 318 and elements 319 and 320 as shown in FIGURE 13a. In the presence of a predetermined magnitude of magnetic flux, reed 318 being relatively flexible is attracted toward elements 319 and 320 for completing circuits between lead 238 and terminals 234 and 236.

Thus, it is clear that contacting engagement of the reed 318 with elements 319 and 320 of a selected one of the switches 300–314, by means to be presently described, will condition a circuit for energizing register coils 218–232 respectively in the same manner as previously described in the embodiment of FIGURES 1–6.

Figure 7:
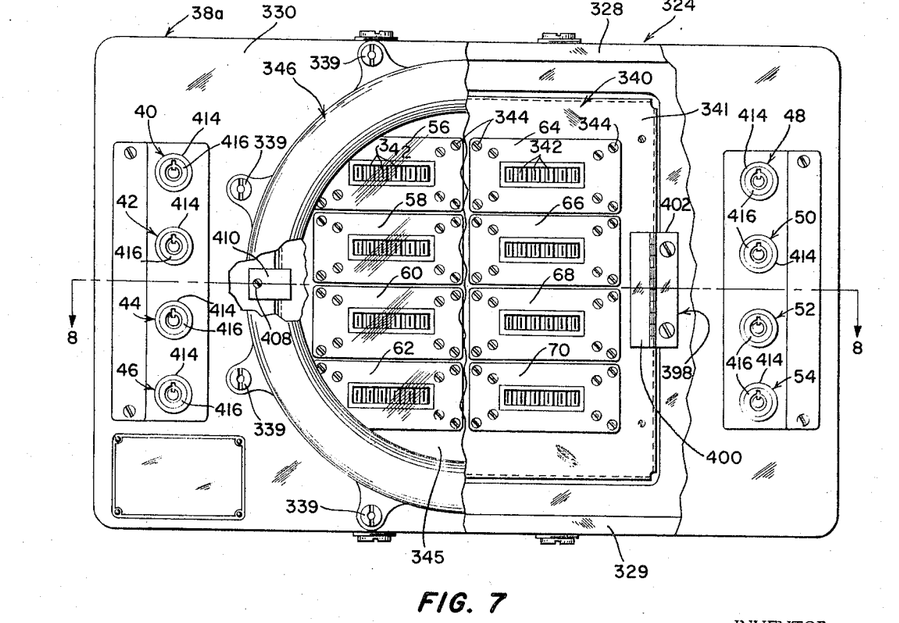
FIGURE 7 is a front elevation of a key control panel according to another embodiment of the present invention and having the front cover of the panel partially broken away to illustrate interior details of the panel.
Figure 8:
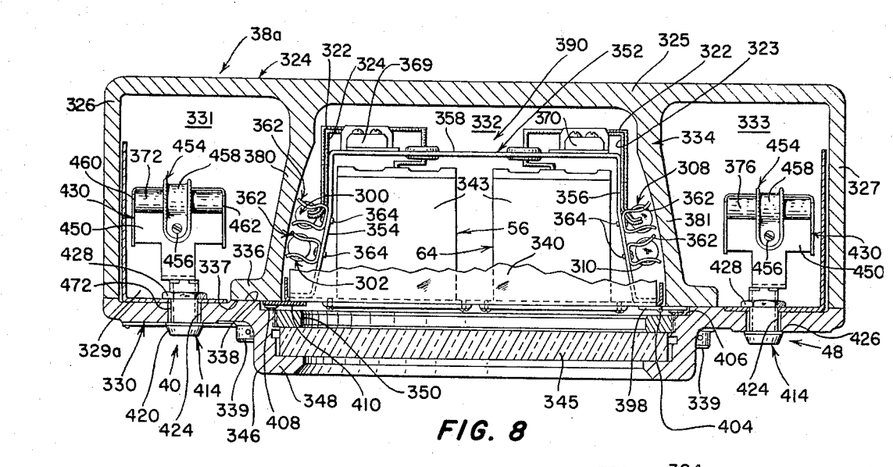
FIGURE 8 is a section taken substantially along lines 8—8 of FIGURE 7.

As best shown in FIGURES 7 and 8, key control panel 38a comprises a cast hollow non-magnetic housing 324 receiving switches 300–314 and preferably made of aluminum. Housing 324 is formed with an upstanding rear wall 325, forwardly extending parallel spaced apart side walls 326 and 327, and parallel spaced apart top and bottom walls 328 and 329 extending perpendicularly between side walls 326 and 327. Housing 324 has an open forwardly directed end 329a (FIGURE 8) delimited by walls 326–329 and closed by an upstanding non-magnetic cast aluminum cover 330. The interior of housing 324 is divided into three side-by-side compartments 331, 332 and 333 (FIGURE 8) by an annular partition wall 334 cast integral with housing 324 and extending forwardly from rear wall 325 equidistantly between side walls 326 and 327. Wall 334 preferably merges with top and bottom walls 328 and 329 at diametrically opposed regions.

As best seen from FIGURE 8, annular wall 334 terminates in a radially outwardly directed cover mounting flange 336 having a flat forwardly directed annular face 337 matingly abutting an annular flat face 338 formed on the interior of cover 330. Cover 330 is removably mounted on housing 324 by a circumferential row of screws 339 extending through cover 330 and threadedly received in mounting flange 336. By tightening screws 339, cover face 338 tightly abuts flange face 337 to provide an endless explosion and fire proof seal in surrounding relationship to the forward open end of compartment 332 for a purpose as will presently appear.

With the foregoing housing construction, it is clear that compartments 331 and 333 are delimited by rear wall 325 and cover 330, and are separated from each other by annular wall 334. Compartment 332 is delimited by annular wall 334, cover 330 and rear wall 325 to thus physically isolate compartment 332 from compartments 331 and 333 and from the exterior of control panel 38a. Compartment 332 is thus delimited by explosion and fire proof walls and, as will be presently described in detail, receives switches 300–314 and registers 56–70 together with actuating coils 218–232 and all interconnecting electrical conductors to physically isolate these components from compartments 331 and 333 and from the exterior of panel 38a. As a consequence, fire and explosion hazards resulting from short circuits or electrical sparks due to making and breaking of circuit connections are precluded.

With continuing reference to FIGURES 7 and 8, registers 56–70 are supported in compartment 332 on a rigid unitary frame 340 having an apertured frame section 341 extending transversely across the forward end of compartment 332 adjacent to cover 330. Registers 56–70 are arranged on frame section 341 in two parallel vertical side-by-side symmetrically disposed rows with registers 56, 58, 60 and 62 being contained in one row and registers 64, 66, 68 and 70 being contained in the other row. Registers 56–70 are each provided with a conventional plural order carry-over type mechanism having a series of counter wheels 342 mounted in a casing 343. Each register casing 343 is fixed solely to frame section 341 as by screws 344 and extends rearwardly from frame section 341. Portions of counter wheels 342 of each of the registers 56–70 are visible through the apertures in frame section 341 and through a circular window 345 mounted in a forwardly extending hollow boss 346 integrally formed on cover 330 radially inwardly of screws 339 and substantially in alignment with the longitudinal axis of annular wall 334. Window 345 is received in boss 346 with a close fit and is axially retained in place between a radially inwardly directed flange portion 348 and a retainer ring 350. Flange portion 348 is formed integral with boss 346 and abuttingly overlaps the front surface of window 345. Retainer ring 350 is suitably fixed in boss 346 in abutting engagement with the rearwardly directed face of window 345 to hold window 345 tightly in place against flange portion 348.

Figures 11, 16:
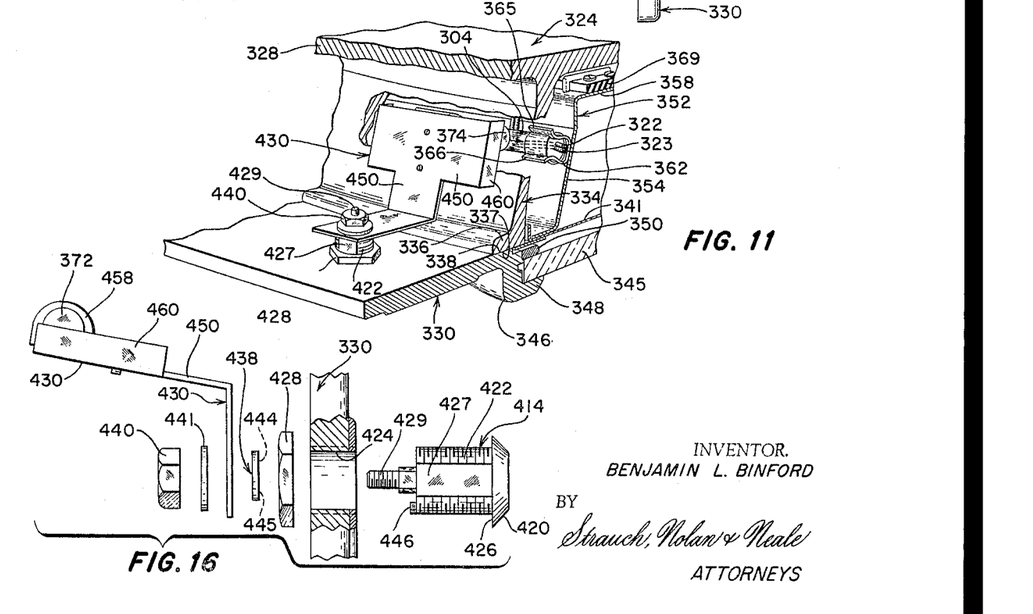
FIGURE 11 is a fragmentary perspective view of the control panel illustrated in FIGURE 7 and showing one of the lock operated magnets disposed in its switch actuating position.
FIGURE 16 is an enlarged exploded view of one of the key operated locks illustrated in FIGURE 10.

As clearly shown in FIGURES 8 and 11, a generally U-shaped reed switch mounting bracket 352 is fixedly secured to frame 340 as by brazing and is formed by parallel spaced apart arms 354 and 356 extending rearwardly from frame 340 on oppositely facing sides of the two rows of registers 56–70 and in close proximity to diametrically opposed regions of annular wall 334. Arms 354 and 356 are integrally joined together by a cross-piece 358 which extends between rear wall 325 and the rearwardly directed ends of the register casings 343 in transverse relationship to the longitudinal axis of annular wall 334.

In accordance with the present invention, each of the switches 300–314 are separately removably clipped in predetermined fixed oriented positions on bracket 352 by a pair of U-shaped cartridge type spring clips 362 and 363 (FIGURES 8 and 9) fixedly secured to bracket 352 as by screws 364 (FIGURE 8) and spaced longitudinally apart at opposite ends of each switch. Spring clips 362 and 363 are each formed with flexible arms 365 and 366 (FIGURES 9 and 15) which snap over the switch end sockets 316 and 317 to retain switches 300–314 in place on bracket 352.

Figure 15:
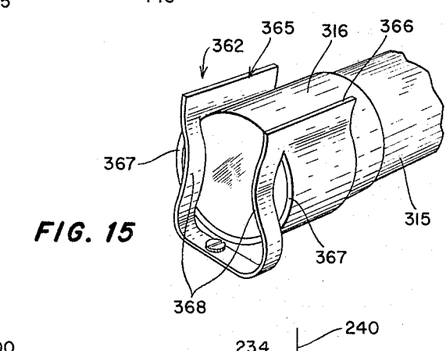
FIGURE 15 is a fragmentary perspective view on one of the magnetically actuated switches and the clip mounting structure illustrated in FIGURES 7–13.

As best shown in FIGURE 15, arms 365 and 366 are each slotted to provide on each arm an outwardly curved bowed portion 367 and a positioning leg portion 368 disposed axially adjacent to bowed portion 367 and curved inwardly and oppositely to the direction of curvature of bowed portion 367. The bowed portions 367 of clip arms 365 and 366 tightly frictionally grip the cylindrical periphery of end sockets 316 and 317 for each switch to retain the associated switches 300–314 against lateral movement on frame 340. The leg portions 368 of clip arms 365 and 366 extend generally chordially over the oppositedly directed end faces of sockets 316 and 317 of each switch and are adapted to abut the end faces of sockets 316 and 317 to axially position and retain the associated switches in a predetermined position on frame 340 for a purpose as will presently appear.

The material of the spring clip arms 365 and 366 is sufficiently springy and elastic to enable the resilient mouth formed thereby to be spread by simply pressing each switch 300–314 into clips 362 and 363.

With reference now to FIGURES 8, 9, 11 and 12, conductors 321–323 of switches 300–306 are detachably connected to a standard terminal block 369 which mounts the fixed terminals 234 and 236 associated with register coils 218–224. Similarly, conductors 321–323 of switches 308–314 are detachably connected to a terminal block 370 preferably of the same construction as terminal block 369 and mounting the fixed terminals 234 and 236 associated with register coils 226–232. Terminal blocks 369 and 370 are fixedly mounted by any suitable means in unstanding side-by-side relationship on the back of bracket cross piece 358.

Thus, it is clear that with the foregoing construction, switches 300–314 are quickly and easily removable for replacement or repair simply by detaching conductors 321–323 and by pulling the switch out of clips 362 and 363. Since the leg portions 368 of clips 362 and 363 axially position and confine each of the associated switches 300–314 to one position on frame 340, switches 300–314 do not have to be axially repositioned every time they are mounted on frame 340 to assure that they are in proper oriented position relative to a series of lock mounted permanent bar magnets 372–379 (FIGURE 12) which respectively provide the magnetic flux for actuating switches 300–314 in a manner to be presently described in detail.

Figure 9:
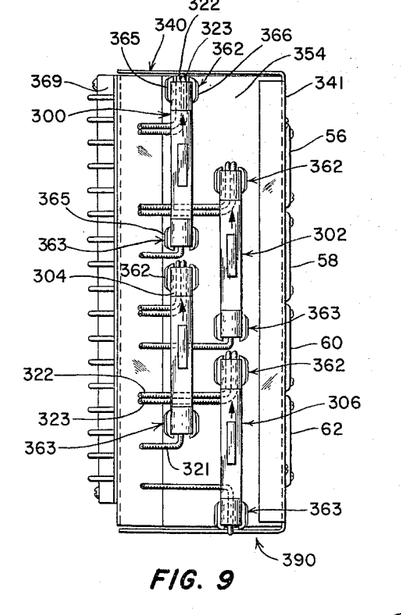
FIGURE 9 is a left-hand elevation of the structurally distinct switch and register sub-assembly shown in the control panel of FIGURE 7.

As best shown in FIGURES 8 and 9, switches 300, 302, 304 and 306 are mounted by their associated clips 362 and 363 on bracket arm 354 in spaced relation between bracket arm 354 and an adjacent region of annular wall 334 indicated at 380 (FIGURE 8). Similarly, switches 308, 310, 312 and 314 are mounted by their associated clips 362 and 363 on bracket arm 356 in spaced relation between bracket arm 356 and an adjacent region of annular wall 332 indicated at 381 (FIGURE 8) and disposed substantially diametrically opposite from wall region 380.

Switches 300–306 on bracket arm 354 are arranged relative to each other such that the magnetic lines of flux produced by each of the bar magnet 372–379 will actuate only one switch. To this end, switches 300 and 304 are contained in one row and are mounted in upstanding coaxially spaced relationship along a common vertical axis extending normal to the longitudinal axis of annular wall 334. Switches 302 and 306 also are mounted in coaxially spaced relationship along a common axis to form a second row in parallel relation to the row containing switches 300 and 304. Switches 302 and 306, as best seen from FIGURE 9, are staggered with respect to switches 300 and 304 with the spacing between switches 300 and 304 and switches 302 and 306 being substantially equal.

The arrangement of switches 308–314 on bracket arm 356 is the same as switches 300–306. To this end, switches 308 and 312 and switches 310 and 314 are respectively contained in two parallel vertical rows with switches 310 and 314 being staggered with respect to switches 308 and 312. With this switch mounting arrangement, switches 300–306 and switches 308–314 are respectively positioned symmetrically to the left and right of the longitudinal axis of annular wall 334 as viewed from FIGURE 8.

The foregoing switch mounting arrangement minimizes the overall height of bracket arms 354 and 356 required for mounting switches 300–314, thus providing for a more compact assembly in addition to positioning each of the switches for actuation by only one of the magnets 372–379.

With continuing reference to FIGURES 7 and 8, it is apparent that frame 340, mounting bracket 352, switches 300–314, and registers 56–70 together actuating coils 218–232 and the electrical leads interconnecting coils 218–232 with switches 300–314 constitute a sub-assembly indicated generally at 390 in FIGURE 8. Sub-assembly 390 is structurally distinct from the remainder of the components of control panel 38a and is disposed completely within compartment 332.

As is evident from the foregoing description of sub-assembly 390, switches 300–314 are mounted solely on mounting bracket 352, and mounting bracket 352 together with registers 56–70 are mounted solely on frame 340. Frame 340, as clearly shown in FIGURES 7 and 8, is hinged to housing 324 for swinging movement about a vertical axis by means of a suitable hinge plate assembly 398 at the right-hand side of frame section 341. Hinge plate assembly 398 is preferably of the flap type having a pair of hinge plates 400 and 402 respectively fixed to frame section 341 and to housing flange 336 and relatively pivotally connected together by means of a removable hinge pin 404 carried by plate 402 and providing the swing axis for frame 340. With cover 330 mounted on housing 324 and with sub-assembly 390 located in its normal meter operating position within compartment 332, frame 340 is swung about the axis of pin 404 to a position shown in the drawings where frame section 341 is contained in a vertical plane extending across the forward end of compartment 332 at substantially right angles to the longitudinal axis of annular wall 334.

With frame 340 swung to its operative position shown in the drawings, the forwardly directed face of frame section 341 is substantially flush with the forwardly directed flat annular surface 337 of flange 336 with hinge assembly 398 projecting into an inwardly opening annular recess 406 formed in cover 330 inwardly of surface 338 in concentric relationship to the longitudinal axis of boss 346.

Frame 340 is secured against movement in the position shown in the drawings by means of a screw 408 threadedly received in annular wall 334 and passing through an apertured tab 410 which is fixed, as by brazing, to frame section 341 at the side opposite from hinge assembly 398. Tab 410 is disposed in recess 406 and extends beyond the left-hand edge of section 341 (as viewed from FIGURE 8) and abuttingly overlaps the forwardly end of wall 334.

By removing cover 330 and screw 408, the entire sub-assembly 390 may be swung out of compartment 332 as a unit and through an arcuate distance of more than 90° thus permitting convenient and ready access to switches 300–314 and to terminal blocks 369 and 370. As a result, switches 300–314 may be easily removed or replaced in the manner previously described. In addition, ready access to terminal blocks 369 and 370 enables any desired changes in the control panel circuitry to be conveniently accomplished without requiring the removal of any component other than cover 330 and screw 408. To this end, it may be desired to reduce the number of registers contained in control panel 38a particular in situations where the control panel is purchased as a package and does not require the maximum number of registers that can be employed with the panel. Also, it may be desired to have some of the registers 56–70 connected to manifest the amount of fluid dispensed from one source and the remaining registers connected to manifest the amount of fluid dispensed and metered from a second source independent of the above-mentioned one source.

With frame 340 secured to housing 324 in the position of components shown in the drawings, it is clear that sub-assembly 390 is completely enclosed in compartment 332 and physically isolated from the other components of control panel 38a, compartments 331 and 333, the fluid being metered and the exterior of panel 38a. Magnets 372–375 are disposed in compartment 331 and magnets 376–379 are disposed in compartment 333. Locks 40–54, as will be presently explained in detail, are operable to position magnets 372–379 respectively for actuating switches 300–314 through wall 334. As a result it will be appreciated that the key controlled magnetic actuation of switches 300–314 enables sub-assembly 390 to be physically isolated in compartment 332 and to thus provide an explosion and fire proof enclosure.

With continued reference to FIGURES 7, 8, 10, 11 and 16, locks 40–54 are key operated to respectively swing magnets 372–379 between operative and inoperative limiting positions corresponding to switch closed and switch opened positions as respectively shown in FIGURE 11 and in FIGURE 8. Locks 40–54 are identical in construction and each lock comprises an outer non-rotatable cylinder 414 fixed to cover 330 and a slotted key receiving lock barrel 416 revolvably mounted concentrically within cylinder 414 in the usual manner. Each lock 40–54 is provided with suitable locking structure (not shown) for permitting lock barrel 416 to be revolved by insertion of the proper key into barrel 416 such as, for example, a standard spring biased pin tumbler construction (not shown) engageable by a key blade (not shown) to unlock barrel 416 for rotation relative to cylinder 414.

Figure 10:
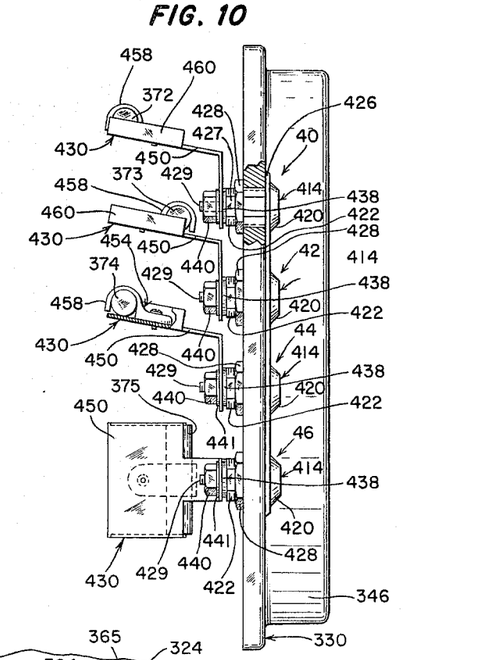
FIGURE 10 is a left-hand elevation of the cover and key operated lock assembly for the control panel shown in FIGURE 7 with a portion of the cover plate being broken away to illustrate details of one of the locks.

As best shown in FIGURE 10, each cylinder 414 has an enlarged head 420 projecting forwardly beyond cover 330 and a body 422 which extends through an aperture 424 in cover 330. Head 420 forms with body 422 an inwardly directed shoulder 426 abutting the outwardly directed surface of cover 330. Body 422 is cylindrical and externally threaded except for at least one flat chordially extending face 427 (FIGURE 11) which interfits with aperture 424 to prevent cylinder 414 from being revolved about its axis. Cylinder 414 is axially held in place on cover 330 by a nut 428 threadedly mounted on the portion of body 422 extending inwardly beyond cover 330 to retain shoulder 426 tightly against the outer face of cover 330.

Figure 14A:
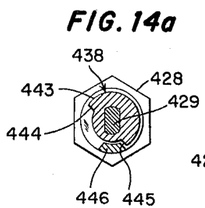
FIGURE 14a is a section taken substantially along line 14a—14a of FIGURE 10 and illustrating the lock barrel limit stops.

With continuing reference to FIGURES 10, 11 14a, 14b and 16, each lock barrel 416 is provided with a reduced diameter externally threaded shank portion 429 projecting beyond the inwardly directed end face of cylinder 414 and non-rotatably carrying a magnet support arm 430. Support arm 430 is held axially in place on shank portion 429 in tight abutment with a limit stop washer 438 by means of a nut 440 threadedly mounted on shank portion 429 and tightly retaining a washer 441 against the inwardly directed surface of arm 430. Washer 438, as best seen from FIGURES 10, 14a and 14b, is non-rotatably carried on shank portion 429 and held tightly in place by nut 440 axially between support arm 430 and an annular shoulder formed on lock barrel 416.

With continued reference to FIGURES 14a and 14b, washer 438 has a radially outwardly extending ear 443 providing two circumferentially opposed stop faces 444 and 445 spaced angularly apart by a predetermined magnitude in excess of 90 degrees. A rigid stop abutment 46 is disposed between the inwardly directed end face of cylinder 414 and arm 430 radially inwardly of ear 443 for abutting engagement with stop faces 444 and 445. Abutment 446 is fixed to cylinder 414 vertically beneath shank 429 and is contained in a plane extending normal to the rotational axis of lock barrel 416 and passing substantially through stop washer 438.

Thus, rotation of lock barrel 416 within cylinder 414 in opposite directions is limited by abutting engagement of stop faces 444 and 445 with oppositely directed circumferential edges of abutment 446. The angular spacing between stop faces 444 and 445 is made greater than 90° by a magnitude equal substantially to the angular distance between the oppositely directed edges of abutment 446 adapted to contact stop faces 444 and 445. As a result, rotation of lock barrel 416 in either direction is limited to 90 degrees for a purpose as will presently appear.

As best shown in FIGURES 10 and 11, support arm 430 is flat sided and extends away from shank 429 at right angles to the rotational axis of lock barrel 416. Approximately midway between its ends, arm 430 is bent and turned sharply inwardly to provide a magnet mounting section 450. As best seen from FIGURE 10, arm section 450 extends inwardly from cover 430 at an angle of almost 90 degrees relative to a plane extending normal to the rotational axis of lock barrel 416. Thus, it is apparent that rotation of lock barrel 416 swings arm section 450 in a segmental circular path which is concentric to the rotational axis of lock barrel 416.

With continuing reference to FIGURES 7 and 8, locks 40–54 together with their support arms 430 are arranged in two parallel vertical rows on opposite sides of compartment 332. One row of locks contains locks 40, 42, 44 and 46 which are mounted on cover 330 to the left of compartment 332 so that the support arms 430 and the lock barrel shanks 429 associated with locks 40–46 are enclosed in compartment 331. The centers on locks 40, 42, 44 and 46, as shown in FIGURE 7, are uniformly spaced along a common straight line.

With continued reference to FIGURES 7 and 8, the remaining locks 48, 50, 52, and 54 are contained in the second row and are mounted on cover 330 to the right of compartment 332 so that the support arms 430 and lock barrel shanks 429 associated with locks 48–54 are enclosed in compartment 333. The centers of locks 48, 50, 52 and 54 are uniformly spaced along a common straight line in the same manner as locks 40–46. The two aforementioned rows of locks 40–46 and 48–54 are respectively arranged symmetrically to the left and right of the center of annular wall 334 thus spacing each row of locks equidistantly from wall regions 380 and 381 of annular wall 334, and respectively from the two sets of switches 300–306 and 308–314. The axes of locks 40–54 are mutually parallel, parallel to the longitudinal axis of annular wall 334 and perpendicular to the longitudinal axes of switches 300–314.

As best shown in FIGURE 8, each of the bar magnets 372–379 is of elongated cylindrical shape and is provided with coaxially aligned oppositely polarized poles at opposite ends. Magnets 372–379 are mounted on the support arm sections 450 of locks 40–54 respectively by means of mounting brackets indicated at 454. Since each of the mounting brackets 454 together with their associated support arms 430 are identical in construction for locks 40–54, only one will be described in detail with like reference numerals designating identical structures. Accordingly, the mounting bracket 454 associated with magnet 372 is fixed to its respective support arm section 450 as by a screw 456 and has a hook-shaped clamp portion 458 forming a mouth opening inwardly toward the outwardly directed flat surface of support arm section 450 and interfittingly receiving bar magnet 372.

Clamp portion 458 is positioned substantially midway between the ends of magnet 372 and partially encircles the magnet. By tightening screw 456, clamp portion 458 snugly fixes magnet 372 in place along an axis extending perpendicular to the rotational axis of lock barrel 416 and tangentially of the arcuate path in which support arm section 450 is swingable.

As best shown in FIGURES 10 and 11, each support arm 430 is provided with a pair of parallel spaced apart magnet positioning ears 460 and 462 projecting outwardly from support section 450 at right angles to the longitudinal axis of the magnet mounted thereon and in close proximity to the flat oppositely directed end faces of the magnet to axially confine and position the magnet in a single position on support arm section 450.

With the foregoing support arm and bracket mounting structure, it is evident that magnets 372–379 can only be mounted in a single predetermined position on their respective support arms 430. The positions of magnets 372–379 on their respective support arms 430, as will not be explained in greater detail, are oriented with respect to the positions of switches 300–314 respectively to allow the magnet flux of magnets 372–379 to influence only one switch.

As best shown in FIGURE 10, magents 372 and 374 associated with locks 40 and 44 are mounted on their respective support arms 430 near the axially inwardly directed end of support arm sections 450 and have their longitudinal axes contained in a common vertical plane which passes through the aligned longitudinal axes of switches 300 and 304. Thus, by revolving lock barrels 416 of locks 40 and 44, magnets 372 and 374 are respectively moved in arcuate paths contained in a common plane which passes through the aligned axes of switches 300 and 304.

With locks 42 and 46, the magnet mounting brackets 454 associated therewith are both turned 180° relative to the magnet mounting brackets for locks 40 and 44 to thus position magnets 373 and 375 nearer cover 330. The axes of magnets 373 and 375 are contained in a common plane passing through the aligned axes of switches 302 and 306 in parallel relation to the plane containing the axes of magnets 372 and 374. Thus, it is evident that magnets 373 and 375 are mounted for movement in arcuate paths contained in a common plane passing through the aligned axes of switches 302 and 306.

When lock barrels 416 of locks 40–46 are rotated in a clockwise direction (as viewed from FIGURE 7) to switch actuating limiting positions where stop faces 444 contact their associated abutments 446, magnets 372–375 will be swung in corresponding directions to vertical positions in close proximity to region 380 of wall 334 and in parallel relation to the longitudinal axes of switches 300–306. In their vertically disposed positions magnets 372–375 are directly opposite from and closely adjacent to their respective switches 300–306 for closing switches 300–306 in the manner previously described. Due to the oriented positions of magnets 372–375 relative to switches 300–306, the magnetic flux of magnets 372–375 exerts a maximum influence on switches 300–306 respectively to assure quick and positive actuation of switches 300–306. Thus, it is apparent that stop faces 444 assure proper positioning of magnets 372–375 for actuating switches 300–306.

To open switches 300–306, lock barrels 416 of locks 40–46 are turned in a counterclockwise direction (as viewed from FIGURE 7) through an angle of 90 degrees where stop faces 445 engage abutments 446 to prevent further counterclockwise movement of the lock barrels. With stop faces 445 contacting their associated abutments 446, magnets 372–375 will be located in corresponding horizontal positions with their axes at right angles to the axes of switches 300–306. As a result, the magnet flux field of magnets 372–375 are moved out of the region of switches 300–306 allowing switches 300–306 to open.

The relationship of locks 48–54, magnets 376–379 and switches 308–314 is essentially the same as that described with respect to locks 40–46, magnets 372–375 and switches 300–36 with magnets 376–379 being respectively in closely adjacent relationship to magnets 372–375 when disposed in corresponding positions. Accordingly, no further description of the relationship between locks 48–54, magnets 376–379 and switches 308–314 is believed to be necessary. It will be appreciated however, that the lock barrels 416 of locks 48–54 are revolved in a counterclockwise direction (as viewed from FIGURE 7) to move magnets 376–379 respectively to their limiting switch actuating vertical positions and are revolved in clockwise directions to move magnets 376–379 to their limiting switch open horizontal positions.

From the foregoing description, it is apparent that locks 40–54 together with their associated magnet support arms 430 and magnets 372–379 are mounted solely on cover 330. As a result replacement or repair of the components of locks 40–54, support arms 430 or magnets 372–379 is readily accomplished simply by removing cover 330 from housing 324.

Figure 17:
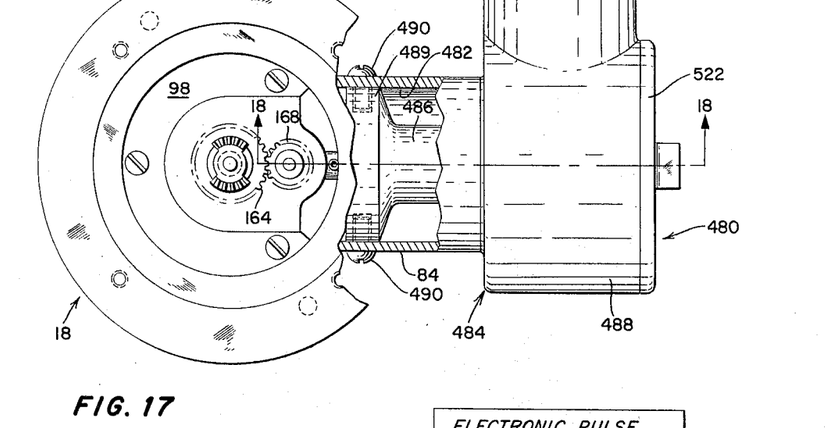
FIGURE 17 is a fragmentary top plan view of a modified form of signal generator and illustrating a photoelectric unit removably attached to the generator housing.
Figure 18:
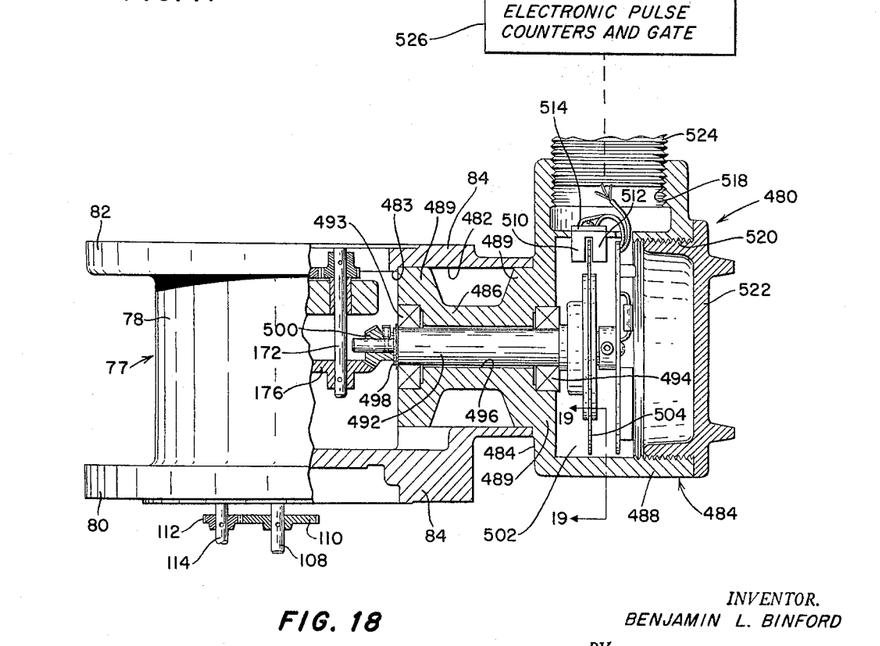
FIGURE 18 is a section taken substantially along lines 18—18 of FIGURE 17 with the photoelectric unit housing rotated 90° from its true position to illustrate the beam producing lamp and beam receiving photocell.
Figure 19:
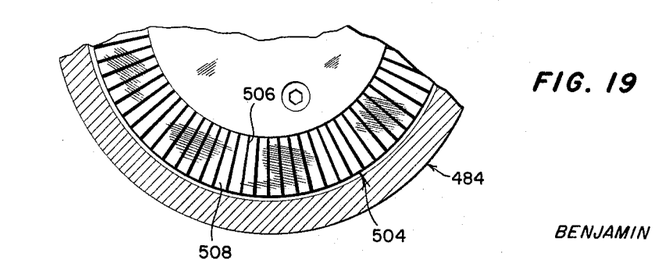
FIGURE 19 is a fragmentary section taken substantially along lines 19—19 of FIGURE 18.

In the embodiment illustrated in FIGURES 17–19, switch 122, shaft 150 and magnet 146 are replaced with a photoelectric pulse generating unit 480. To mount unit 480 in place of magnet 146 and switch 122, boss 84 of housing 77 is modified to provide a through bore 482 having a smooth internal cylindrical wall surface and an arcuate rigid stop lip portion 483 extending radially inwardly at the inner end of bore 482.

As shown in FIGURES 17 and 18, unit 480 comprises a fire and explosion proof metallic housing 484 preferably made of cast aluminum and having a boss portion 486 projecting from a hollow body portion 488. Boss portion 486 is received in bore 482 of housing 77 and has two axially spaced radially protruding support sections 489 formed with peripheral cylindrically shaped surfaces which slidably interfit with the wall surface of bore 482. Housing 484 is removably secured to housing 77 by means of a pair of diametrically opposed screws 490 (FIGURE 17) extending through the annular wall of boss 84 and threadedly received in boss portion 486. The inwardly directed end face of boss portion 486 is flat and abuttingly engages lip 483 to limit and thereby axially position housing 484 in boss 84. With this housing and support structure, it is clear that housing 484 is readily removable from housing 77 by removing screws 490 and by slidably withdrawing housing 484 from boss 84.

With continued reference to FIGURE 18, unit 480 is provided with a metallic drive spindle 492 rotatably mounted means of conventionally formed axially spaced apart ball bearings 493 and 494 in a through bore 496 formed coaxially in housing boss portion 486. Drive spindle 492 is axially retained in place as by a retaining ring 498 and projects at both ends beyond bore 496. Drive spindle 492 extends into the interior of housing 77 at its inner end and non-rotatably carries thereon a beveled gear pinion 500 which is in constant meshing engagement with gear 176 described in the embodiment of FIGURES 1–6. As a result, drive spindle 492 is drive connected to shaft 172 for rotation by output shaft 114 through the gear train previously described in the embodiment of FIGURES 1–6.

With continuing reference to FIGURE 18, the outer opposite end of drive spindle 492 projects into a chamber 502 formed by housing body 488. Chamber 502 is isolated from the interior of housing 77 by boss portion 486 which provides with drive spindle 492 a flame path extending along the length of spindle 492 disposed in bore 496. This flame path is made fireproof by bore 496 which has a maximum diametrical clearance of 0.005 inch with spindle 492 for a length of 2 inches to thus eliminate the danger of explosion and fire due to an inadvertent electrical arcing occurring in chamber 502 of housing 484. Non-rotatably mounted on the outer end of drive spindle 492 which projects into housing chamber 502, is a light interrupting radially slotted disk 504 having alternate light transmissive and opaque sections indicated at 506 and 508 respectively in FIGURE 19.

Disk 504 interrupts light from a lamp 510 to a photocell 512. Lamp 510 and photocell 512 are respectively secured in place within chamber 502 by means of a bracket 514 on oppositely facing sides of disk 504 such that the beam of light from lamp 510 is directed along a line extending in parallel relation to the rotational axis of disk 504 and intersects the alternately transmissive and opaque sections 506 and 508 as disk 504 is rotated. A sufficiently large number of alternately light transmissive and opaque sections 506 and 508 are provided to produce a large number (e.g., 500) of pulses for each revolution of drive spindle 492.

With continuing reference to FIGURE 18, housing body 488 is provided with two mutually perpendicular threaded openings 518 and 520. Opening 520 provides access to the chamber 502 and to disk 504 and is closed by a threaded lid 522 which delimits chamber 502 with body 488.

Opening 518 threadedly receives an electrical conduit 524 through which electrical leads extend for interconnecting lamp 510 and photocell 512 with an electronic pulse counter and gate circuit indicated generally at 526 and disposed remote from unit 480 at any desired location. Counter 526 may be of any conventional form such as the counter and its associated gate circuit shown and described in copending application Serial No. 203,982, filed June 20, 1962, by Harry W. Fisher, David J. Gestler, and Leo M. Walch Jr., and assigned to the assignee of the present application.

From the foregoing description, it is apparent that the pulse generating photoelectric unit 480 is structurally distinct and the other components of generator 18 and is removable as a unit from housing 77 simply by removing screws 490. In addition, the chamber 502 containing light interrupting disk 504, lamp 510, photocell 512 and the electrical connections thereto are isolated from the interior of housing 77 by the fire wall formed by boss 486 and the portion of drive spindle 492 disposed within bore 496.

As a result of mechanically isolating pulse counter 526 from the output of meter 10 by means of unit 480, it is apparent that no torque load is applied on the meter output by counter 526. Thus, the drag of the output of meter 10 is significantly reduced in comparison to conventional form of registers employing mechanically actuated counter connected to the meter output shaft by standard drive trains.

By removably attaching the switch casing 126 described in the embodiment of FIGURES 1–6 it is apparent that switch 122 together with magnet 146 are readily replaceable with the removable photoelectric signal producing unit 480. Consequently, either magnetically actuated switch 122 or photoelectric unit 480 may be employed in conjunction with signal generator 18 to meet varied conditions encountered in the field.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a fluid meter,
   (a) an electrical signal generating device actuated in predetermined relation to the flow of fluid through said meter,
   (b) a plurality of electrical signal responsive registers,
   (c) switch means magnetically actuable to connect said signal responsive registers individually to said signal generating device for actuation of the former in response to a signal generated by the latter and
   (d) key operated lock controlled magnetic means for selectively actuating said switch means to connect a selected one of said responsive registers to said signal generating device.

2. In combination with a fluid metering device,
   (a) electrical signal generating means operably connected to said metering device to generate signals in predetermined relation to flow of fluid through said metering device and
   (b) a signal responsive controller comprising;
   (c) a multi-component casing having a removable cover and a hollow open ended housing closed by said cover, said housing having wall means providing a compartment delimited by said cover,
   (d) signal responsive register means,
   (e) switch means actuatable to connect said signal response register means to said signal generating means for actuation of the former in response to signals generated by the latter,
   (f) unitary frame means solely mounting said register means and said switch means in said compartment and being structurally distinct from said casing,
   (g) means swingably mounting said frame means on said housing for displacement to a position exteriorly of said compartment when said cover is removed, and
   (h) manually operable controller means mounted on said cover for selectively actuating said switch means through said wall means.

3. The combination defined in claim 2 wherein said means swingably mounting said frame means comprises a hinge pin and plate assembly with the pin thereof being removable to enable said frame together with said register means and said switch means to be removed from said casing as a unit.

4. In combination with a fluid meter,
   A. an electrical signal generating device having a pair of contacts disposed in an electrical circuit and actuated by said meter to produce a series of electrical pulses in predetermined relation to the flow of fluid through said meter, and
   B. a plurality of register and control units each comprising:
      (a) an electrically actuatable register,
      (b) a switch actuatable to electrically connect said register to said contacts for actuation of the former in response to pulses generated by the latter, and
      (c) means for actuating said switch including key operated means operative when key operated to its "on" position to actuate said switch for electrically connecting said register to said contacts.

5. The combination defined in claim 4 comprising valve means for controlling delivery of said fluid to said meter and valve operator means operatively connected to said valve means and being under the control of each of the switches of said units to allow delivery of fluid to said meter when each switch is actuated to electrically connect its associated register to said signal generating device.

6. The combination defined in claim 4 wherein said key operated means comprises a revolvable lock barrel and wherein said means for actuating said switch further comprises a permanent magnet positionable by rotation of said lock barrel to actuate said switch.

7. The combination defined in claim 6 comprising means mounting said switch in a fixed predetermined position which is oriented with respect to the actuating position of said magnet.

8. In a fluid dispensing system,
A. a fluid supply, a fluid meter, and a delivery conduit connected in series fluid communication,
B. an electrical signal generator driven by said meter in predetermined relation to the flow of fluid through said meter and having a pair of signal output terminals, and
C. a plurality of register and control units each comprising:
 (a) an electrically actuatable register,
 (b) a switch actuatable to electrically connect said register to said signal output terminals to actuate said register in response to signals generated by said generator, and
 (c) means for actuating said switch including key operated lock means operative when key operated to its "on" position to actuate said switch for electrically connecting said register to said generator.

9. The system defined in claim 8 embodying
(a) a selectively presetable register drive connected to said meter and
(b) a control valve actuated by said presetable register to terminate fluid flow therethrough after passage of the selected preset quantity of fluid therethrough.

10. The combination defined in claim 8 comprising means for preventing actuation of any of the registers of said units in the event a signal is applied to said terminals at the time said lock means is operated so long as such signal is maintained.

11. In combination with a fluid metering device having an output member movable in accord with fluid flow through said metering device,
A. electrical signal generating means having an input element operatively connected to said output member and an electrical signal output device responsive to movement of said output member to generate electrical signals in predetermined relation to flow of fluid through said metering device,
B. a hollow casing formed structurally independent of said metering device and said signal generating means and having wall means,
C. means cooperating with said wall means for providing a fluid tight envelope, and
D. a plurality of register and control units each comprising:
 (a) an electrically actuatable register supported by said casing in said envelope,
 (b) a switch supported by said casing in said envelope and being magnetically actuatable to electrically connect said output device to said register,
 (c) magnetic means supported by said casing exteriorly of said envelope and being movable to actuate said switch, and
 (d) key operated lock means supported by said casing exteriorly of said envelope and being operative when key operated to an "on" position for positioning said magnetic means to actuate said switch, said output device and the switch and register of each of said units being isolated by said envelope from contact with fluid flowing through said metering device.

12. In combination with a fluid metering device,
(a) an electrical signal generating device operably connected to said metering device to generate signals in predetermined relation to flow of fluid through said metering device,
(b) a hollow casing formed structurally independent of said metering device and said signal generating device,
(c) electrical signal responsive register means mounted in said casing,
(d) switch means mounted in said casing and being magnetically actuatable to electrically connect said register means to the output of signal generating device,
(e) magnetic means supported by said casing and being movable to actuate said switch means,
(f) key operated lock means supported by said casing and being operative to an "on" position for positioning said magnetic means to actuate said switch means, thereby connecting said register means to the output of said signal generating device, and
(g) means cooperating with said casing for providing a fluid tight envelope receiving said switch means and said register means and isolating said switch means from said metering device, said key operated lock means, and said magnetic means.

References Cited by the Examiner

UNITED STATES PATENTS

| | | | |
|---|---|---|---|
| Re. 14,381 | 10/1917 | Kjellgren | 235—921 |
| 1,564,519 | 12/1925 | Brown. | |
| 1,886,844 | 11/1932 | Spitzglass | 73—432 |
| 2,060,674 | 11/1936 | Hicks | 235—94 |
| 2,207,506 | 7/1940 | Cox | 200—87.30 X |
| 2,323,910 | 7/1943 | Hubbell | 200—87.3 |
| 2,522,845 | 9/1950 | Stevens | 235—94 |
| 2,538,243 | 1/1951 | Hazard et al. | |
| 2,769,594 | 11/1956 | Dimmett | 235—94 X |
| 2,838,237 | 6/1958 | Spaunburg et al. | 235—94 |
| 2,872,597 | 2/1959 | Ormond | 200—87.3 |
| 2,903,321 | 9/1959 | Moude | 346—145 X |
| 2,915,606 | 12/1959 | Knauth | 200—87.3 |
| 2,985,368 | 5/1961 | Kohler et al. | 235—921 |
| 3,026,032 | 3/1962 | Settlemire | 235—94 |
| 3,060,291 | 10/1962 | Clare | 200—87 |
| 3,093,307 | 6/1963 | Hague et al. | 235—94 |
| 3,114,020 | 12/1963 | Hull | 200—87 |
| 3,154,672 | 10/1964 | Larkin | 235—94 X |
| 3,206,567 | 9/1965 | Grimm | 200—44 |

RICHARD B. WILKINSON, *Primary Examiner.*

LEO SMILOW, LOUIS J. CAPOZI, *Examiners.*

C. G. COVELL, J. G. MURRAY, *Assistant Examiners.*